United States Patent Office 3,400,071
Patented Sept. 3, 1968

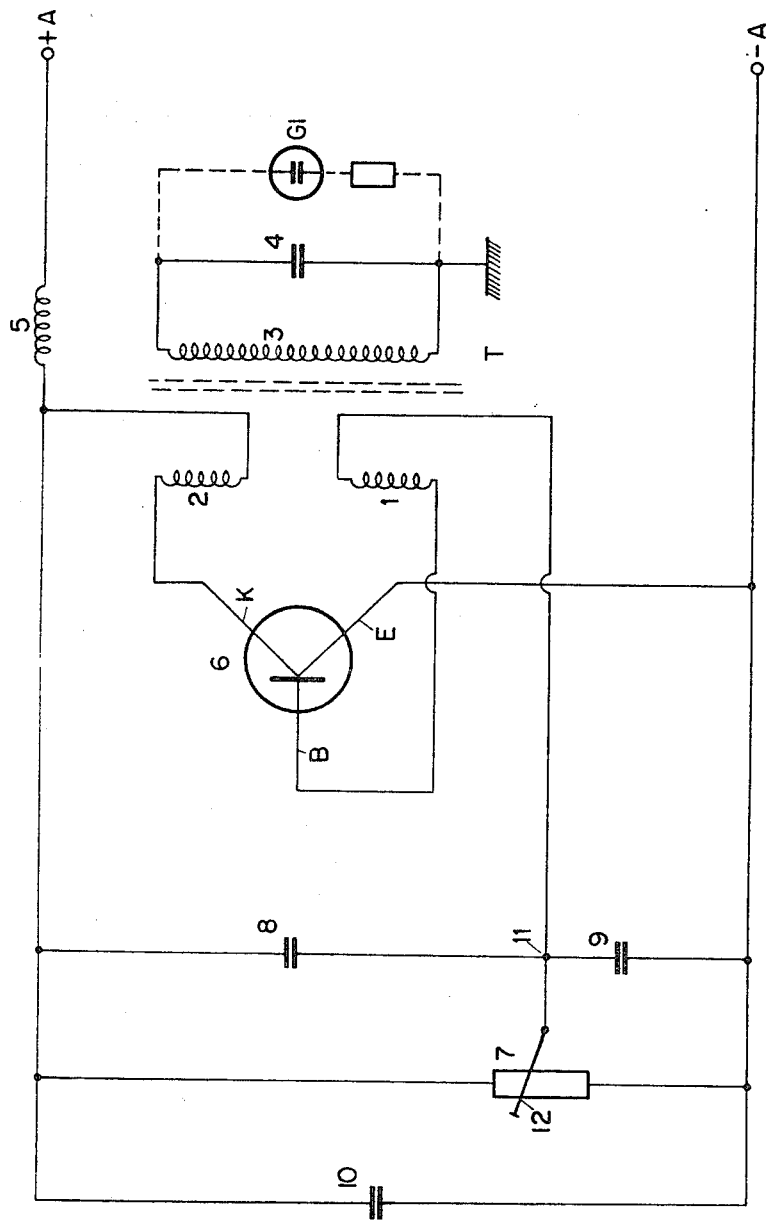

3,400,071
OZONIZING APPARATUS FOR AIR
Otto F. Zwoboda, Vienna, Austria, assignor to Arethusa Establishment, Vaduz, Liechtenstein
Filed Sept. 8, 1965, Ser. No. 485,710
3 Claims. (Cl. 204—317)

ABSTRACT OF THE DISCLOSURE

The invention relates to apparatus for producing ozone including a pair of electrodes, a transformer having a secondary winding connected to the electrodes, and an electrical oscillator. In one embodiment, the oscillator includes a transistor with a first primary winding connected to the base and a second to the collector and a variable resistance connected between the other ends of the two primary windings so that when a source of energy is applied to the oscillator a changing electrical current is produced in the two primary windings.

---

The present invention is related to an ozonizing apparatus for air having electrodes defining a glow discharge path and being connected to the secondary winding of a high voltage transformer.

Known apparatus for this purpose hitherto are operated from the normal alternating current light or power supply lines which are connected to the primary winding of the high voltage transformer. According to official rules and regulations related to apparatus being operated from power supply lines, which are existing in most countries, such high voltage transformers have to meet determined requirements and safety regulations especially to prevent overload and to protect the user; such requirements and the necessary fitting up normally cause remarkable costs, as well as more space and complexity of the apparatus. Moreover it is a disadvantage for the user of such ozonizing apparatus that for operation light or power supply lines are necessary.

It is an object of the present invention to avoid these disadvantages and to provide a very cheap, space saving, universal suitable and for the user harmless ozonizing apparatus for air.

Another object is to provide an ozonizing apparatus comprising electrodes defining a glow discharge path and being connected to the secondary winding of a high voltage transformer, the primary windings of this transformer and a transistor are parts of a self-exciting oscillator circuit to be operated by direct or alternating current; the base of the said transistor is connected through one of the primary windings to the brush terminal of a potentiometer which has its ends connected to the two supply terminals of the apparatus and each of its two sections bridged by a condenser, the emitter and through the other of the primary windings the collector of the transistor are connected to oppose supply terminals.

A further object of the invention is to provide a known transistor power amplifier supplying the primary windings of the transformer.

Transistor oscillator circuits for producing high D.C. voltages are known but hitherto it was not discovered that such circuits are suitable for ozonizing apparatus. A careful study shows that such a circuit is able to fulfill all requirements of the cheap, space saving, universal suitable and harmless ozonizing apparatus according to the present invention because only a harmless low supply voltage and a modest space are necessary. A transistor oscillator of this type may be operated by D.C. or A.C. current so that an ozonizing apparatus according to the invention can be supplied from batteries and is portable.

Only a few circuit elements are required for such an apparatus and the high voltage transformer may be of a very simple design for battery supply.

The ozonizing apparatus according to the invention is explained below in detail in connection with the attached drawings showing a circuit for an embodiment of the invention.

The high voltage transformer T is provided with three windings 1, 2, and 3. The high voltage winding 3 is bridged by a capacity shown as 4 but in fact determined by the capacity of the glow discharge electrodes; this high voltage circuit is determining the frequency of the oscillator. The winding 1 is connected with its one end to the base B of the transistor 6 whilst the other end has a connection to the brush terminal 12 of the potentiometer 7, as well as to the middle point 11 of a capacitance voltage divider formed by the series connected condensers 8 and 9. The potentiometer 7, the bridging condenser 10 and the voltage divider 8, 9 are all three parallel one to the others and the one end of these three parallel arms is connected in series with an inductance coil 5 to the supply terminal +A; the other end of the said three parallel arms is connected to the supply terminal −A. The one end of the winding 2 is connected to the collector K of the transistor 6 and the other end to the point common to the inductance coil 5, the potentiometer 7 and the condensers 8 and 10. The emitter E of the transistor is connected to the supply terminal −A.

The terminals +A and −A are supplied by a suitable D.C. current source per example by a battery. According to the type of transistor 6 the supply terminals may also have the reverse polarity.

The function of the shown transistor circuit is well known and needs no further explanation. In such a circuit self-exciting oscillations are produced by the transistor 6 inducing in the winding 3 a high voltage determined by the winding ratio; this high voltage is ozonizing the air between the electrodes of the glow discharge path shown as capacity 4. The potentiometer 7 enables one to adjust the best operating point of the transistor 6. It is preferred to choose the resistance value of the potentiometer 7 and the capacitance of the condensers 8 and 9 according to the characteristic of the used transistor 6 in such manner that easy self-exciting and stable oscillations are produced in a wide range of the supply voltage.

If desired the glow discharge electrodes may be provided with a series connected resistor. The high voltage winding 3 may be bridged by a glow lamp in series with a resistor as shown in the drawing with dashed lines. With a ground connection of the one end of the high voltage winding 3 as shown in the drawing it is sufficient to connect only one of the two electrodes defining the glow discharge path to the other end of the winding 3.

The circuit as shown in the drawing also may be operated by a low voltage A.C. through a reduction transformer from the normal light or power supply lines. Using known transistor types for high power the ozonizing apparatus according to the invention may be designed to produce a high intensive glow discharge. If desired a known high power transistor amplifier may be provided between the self-exciting transistor oscillator circuit and the high voltage transformer.

The cheap and small transportable ozonizing apparatus according to the invention is especially suitable for the production of ozone and for the improvement of the air in living rooms, vehicles and boats.

EXAMPLE

An ionizing apparatus according to the above described circuit may be provided with circuit elements having the following values:

Transformer (T) has a Ferrocube U-shaped core type K 5-45205/3C4 and a coil 1 with 4 windings, a coil 2 with 8 windings and a coil 3 with 3500 windings.
Inductance coil 5 with 1,3 millihenry.
Transistor 6 type AD 133
Potentiometer 7 with 600 ohm resistance.
Condensor 8 with 125 microfarad.
Condensor 9 with 125 microfarad.
Condensor 10 with 40 microfarad.
D.C. current source +A, —A with 6 volts voltage.
Capacity 4 of the used four glow discharge electrodes (each provided with a glass tube of 0.28″ diameter having aluminium foil at the inner surface and metal layer at the outer surface) was about 125 picofarad.

With these circuit elements the apparatus produced self-exciting oscillations of about 20 kilocycles and across the windings 3 a voltage of about 5000 volts. The ionizing effect of the apparatus was sufficient.

What is claimed is:

1. In an ozone generator having a pair of electrodes, and means for causing an electrical discharge between said electrodes including an electrical oscillator circuit and a transformer, the improvement wherein said transformer has a first and a second primary winding, one end of said secondary winding being connected to one of said electrodes and the other end of said secondary winding being connected to the other of said electrodes, and said oscillator circuit includes a transistor having a base, an emitter and a collector, one end of said first primary winding being connected to said base and one end of said second primary winding being connected to said collector, a variable resistance connected between the end of said first winding opposite said one end of said first winding and the end of said second winding opposite said one end of said second winding, and means for connecting a source of electrical energy between said end of said second winding opposite said one end of said second winding and said emitter to cause said oscillator circuit to produce a changing electrical current in said first and second primary windings.

2. A generator as in claim 1 wherein said oscillating circuit includes a first capacitor connected between said end of said second primary winding opposite said one end and said emitter, a second capacitor connected between said end of said second primary winding opposite said one end of said second winding and said end of said first winding opposite said one end of said first winding and a third capacitor connected between said end of said first winding opposite said one end of said first winding and said emitter.

3. A generator as in claim 2 wherein said connecting means includes an inductance coil.

References Cited

UNITED STATES PATENTS 2,189,279    2/1940    Bitner _____ 204—317

ROBERT K. MIHALEK, *Primary Examiner.*